(12) United States Patent
Lai et al.

(10) Patent No.: US 8,547,819 B2
(45) Date of Patent: Oct. 1, 2013

(54) COMPUTING DEVICE AND CROSSTALK INFORMATION DETECTION METHOD

(75) Inventors: Ying-Tso Lai, Taipei Hsien (TW); Shi-Piao Luo, Shenzhen (CN); Cheng-Hsien Lee, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 497 days.

(21) Appl. No.: 12/961,906

(22) Filed: Dec. 7, 2010

(65) Prior Publication Data
US 2012/0026902 A1 Feb. 2, 2012

(30) Foreign Application Priority Data
Jul. 29, 2010 (CN) .......................... 2010 1 0240254

(51) Int. Cl.
*H04J 1/12* (2006.01)
(52) U.S. Cl.
USPC .......................................... 370/201; 370/252
(58) Field of Classification Search
USPC ........ 370/201, 229, 241, 248, 252; 379/1.03, 379/1.04, 24, 414, 416, 417
See application file for complete search history.

(56) References Cited

U.S. PATENT DOCUMENTS

| 5,435,316 A * | 7/1995 | Kruse ........................... 600/510 |
| 7,798,857 B2 * | 9/2010 | Hammond et al. ...... 439/620.22 |
| 8,446,152 B2 * | 5/2013 | Tsubamoto .................... 324/537 |
| 2006/0206844 A1 * | 9/2006 | Katou ................................ 716/5 |
| 2009/0265593 A1 * | 10/2009 | Nobekawa ..................... 714/726 |
| 2011/0043512 A1 * | 2/2011 | Ooga ............................. 345/212 |
| 2011/0206211 A1 * | 8/2011 | Dahan et al. .................... 381/58 |
| 2011/0273240 A1 * | 11/2011 | Lin .................................... 333/4 |

* cited by examiner

*Primary Examiner* — Kwang B Yao
*Assistant Examiner* — Nguyen Ngo
(74) *Attorney, Agent, or Firm* — Altis Law Group, Inc.

(57) ABSTRACT

A computing device and a method reads a circuit board layout file from a storage device, and selects a first signal transmission line from circuit board layout file as a target line. The computing device and method computes a distance between the target line and the aggressor line corresponding to each unit sample length. If the distance is more than or equal to a height of a sample region, the computing device and method defines the height of the sample region as a crosstalk space between the target line and the aggressor line corresponding to a unit sample length. Otherwise, if the distance is less than the height of the sample region, the computing device and method defines the distance as the crosstalk space between the target line and the aggressor line corresponding to the unit sample length.

20 Claims, 4 Drawing Sheets

COMPUTING DEVICE AND CROSSTALK INFORMATION DETECTION METHOD

BACKGROUND

1. Technical Field

Embodiments of the present disclosure relates to circuit simulating systems and methods, and more particularly, to a computing device and a crosstalk detection method for a circuit board as performed by the computing device.

2. Description of Related Art

A circuit board may have thousands of signal transmission lines thereon. Such high density of distribution of the signal transmission lines drastically reduces distance between the signal transmission lines and promotes signal crosstalk such as electromagnetic interference and coupling of neighboring lines, which reduces signal integrity. Therefore, it is necessary to incorporate design simulations and detects during the design and layout process of the circuit board. However, crosstalk information such as crosstalk spaces between signal transmission lines from a circuit board layout are often acquired manually. With the large quantity of signal transmission lines distributed on the circuit board, manual operation is not only time-consuming, but also error-prone.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
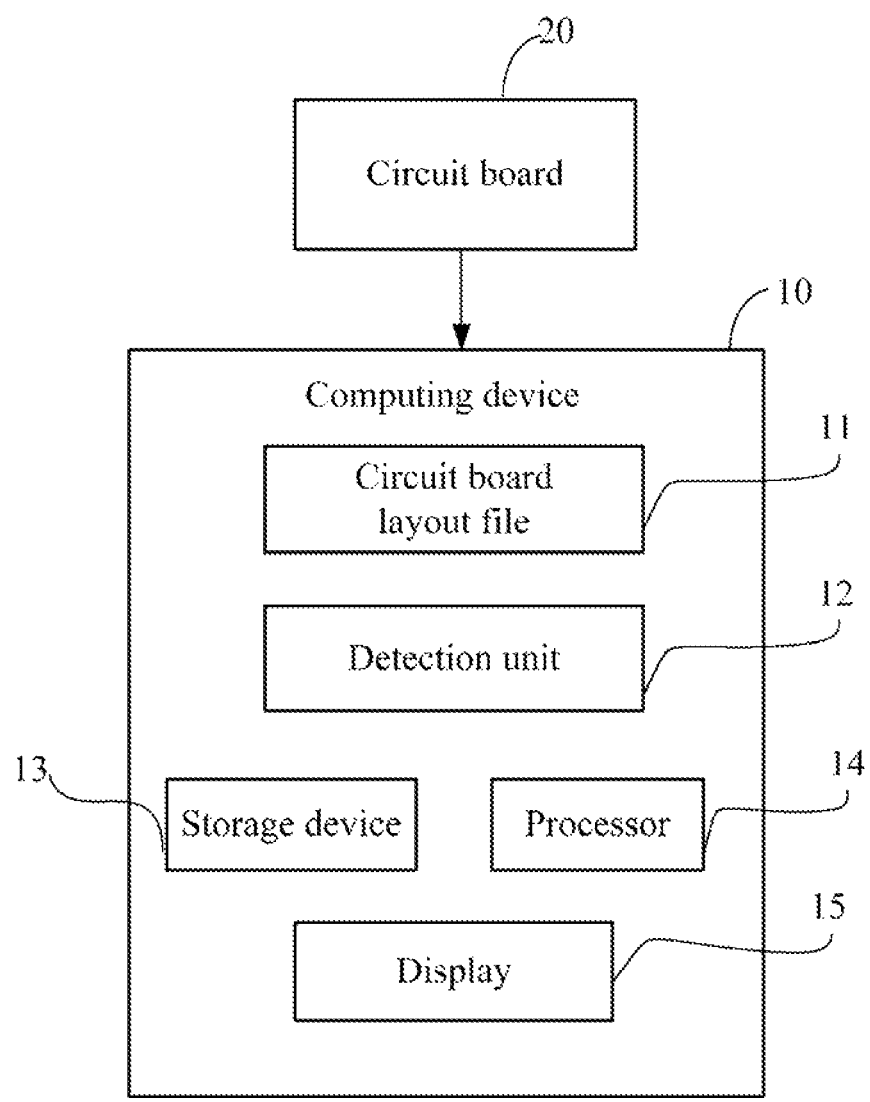
FIG. 1 is a block diagram of one embodiment of a computing device for detecting crosstalk information of signal transmission lines of a circuit board.

FIG. 1 is a block diagram of one embodiment of a computing device 10. The computing device 10 stores a circuit board layout file 11 of a circuit board 20. In this embodiment, the computing device 10 further includes a detection unit 12, a storage device 13, a processor 14, and a display 15. The detection unit 12 includes a number of function modules (detailed description is given in FIG. 2) The function modules may comprise computerized code in the form of one or more programs that are stored in the storage device 13. The computerized code includes instructions that are executed by the processor 14, to detect crosstalk information, such as crosstalk spaces between signal transmission lines in the circuit board layout file 11. The circuit board layout file 11 can comprise one or more files detailing layout information of signal transmission lines and related components of one or more printed circuit boards.

The display 15 displays the circuit board layout and a user interface allowing selection of signal transmission lines to be detected and output detection results. Depending on the embodiment, the storage device 13 may be a smart media card, a secure digital card, or a compact flash card. The computing device 10 may be a personal computer, or a server, for example.

Figure 2:
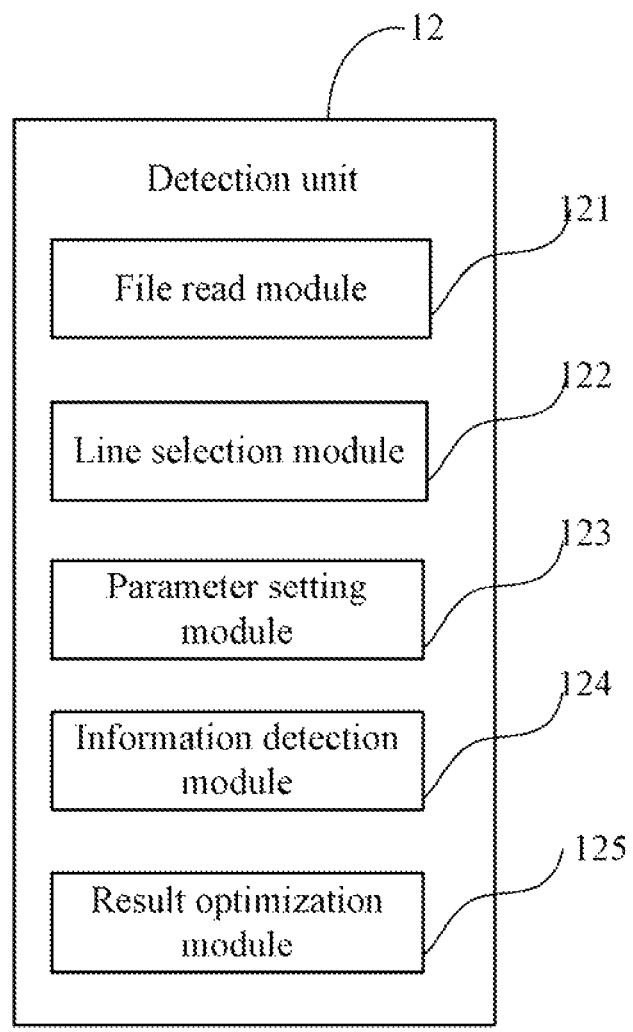
FIG. 2 is a block diagram of one embodiment of function modules of a detection unit in the computing device of FIG. 1.

FIG. 2 is a block diagram of the function modules of the detection unit 12 in the computing device 10 of FIG. 1. In one embodiment, the detection unit 12 includes a file read module 121, a line selection module 122, a parameter setting module 123, an information detection module 124, and a result optimization module 125.

The file read module 121 reads the circuit board layout file 11 from the storage device 13. In one embodiment, the circuit board layout file 11 includes arrangement information of signal transmission lines of the circuit board 10, such as the number of signal transmission lines arranged on the circuit board 10, length of each signal transmission, and orientation of each signal transmission line.

The line selection module 122 selects a first signal transmission line from the circuit board layout file 11 as a target line, to detect crosstalk information from nearby signal transmission lines to the target line. It is understood that, a signal transmission line may be interfered by nearby signal transmission lines, and may also interfere nearby signal transmission lines. In one embodiment, signal transmission lines that are interfered are regarded as target lines, signal transmission lines that interfere other signal transmission lines are regarded as aggressor lines.

Figure 4:
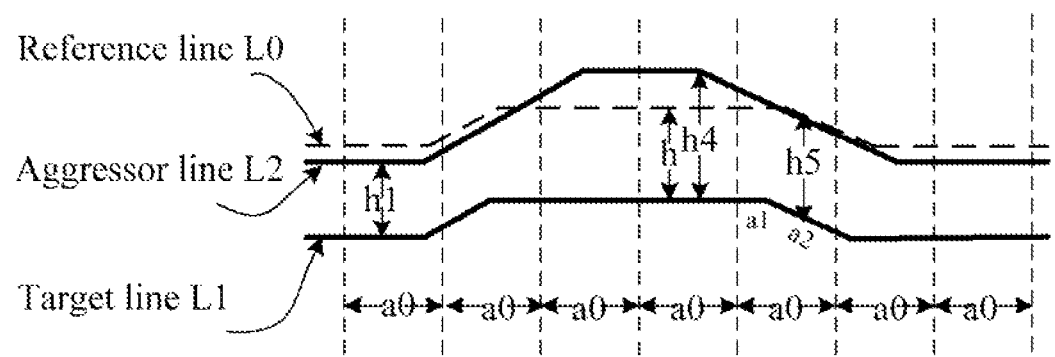
FIG. 4 is one embodiment of a target line, an aggressor line, and a reference line.

The parameter setting module 123 receives detection parameters set by a user. In one embodiment, the detection parameters include a height of a sample region, and a unit sample length along the orientation of the target line. The sample region is an area determined by the target line and a reference line parallel to the target line. The height of the sample region is a distance between the target line and the reference line. For example, as shown in FIG. 4, the reference line L0 and the target line L1 determine the sample region, the distance h between the reference line L0 and the target line L1 is the height of the sample region. In FIG. 4, a0 represents the unit sample length for detecting the target line L1 along the orientation of the target line L1. It is understood that, the less of the unit sample length be set, the higher precision of the crosstalk information be obtained.

The information detection module 124 determines a second signal transmission line as an aggressor line according to the sample region. In one embodiment, if a part of a signal transmission line falls in the sample region, the signal transmission line is regarded as the aggressor line. For example, in FIG. 4, a part of a second signal transmission line L2 falls in the sample region determined by the reference line L0 and the target line L1, so the second signal transmission line L2 is regarded as the aggressor line L2.

The information detection module 124 further computes a distance between the target line and the aggressor line corresponding to each unit sample length. It is understood that, since the orientation of the target line and the aggressor line may change, the distance between the target line and the aggressor line corresponding to a unit sample length may be variable. If the target line goes the longest extension length corresponding to a unit sample length, then the target line suffers severest crosstalk of the aggressor line during the longest extension length corresponding to the unit sample length. Therefore, in this embodiment, the distance between the target line and the aggressor line corresponding to each unit sample length is a largest distance value between the aggressor line and the longest extension length of the target line corresponding to the unit sample length. For example, in FIG. 4, corresponding to the fifth unit sample length a0, the target line L1 first horizontally goes a first extension length a1, then downwards goes a second extension length a2, and the second extension length a2 is more than the first extension length a1, so the distance between the target line L1 and the aggressor line L2 corresponding to the fifth unit sample length a0 is a largest distance value h5 between the aggressor line L2 and the longest extension length a2 of the target line L1.

In addition, the information detection module 124 totalizes the unit sample lengths corresponding to the same distance value as an extension length of the target line corresponding to the same distance value. For example, if a distance between the target line L1 and the aggressor line L2 corresponding to the ninth unit sample length a0 equals h5, then an extension length of the target line L1 corresponding to h5 may be a0+a0=2a0.

Moreover, the information detection module 124 determines if the distance between the target line and the aggressor line corresponding to each unit sample length is less than the height of the sample region. In this embodiment, it is understood that, crosstalk effect of the aggressor line to the target line while the distance is more than the height of the sample region approaches to the crosstalk effect of the aggressor line to the target line while the distance equals the height of the sample region. Therefore, if the distance between the target line and the aggressor line corresponding to a unit sample length is more than or equal to the height of the sample region, the result optimization module 125 defines the height of the sample region as a crosstalk space between the target line and the aggressor line corresponding to the unit sample length. For example, in FIG. 4, corresponding to the fourth unit sample length a0, the distance h4 between the target line L1 and the aggressor line L2 is more than the height h of the sample region, then the result optimization module 125 defines the height h of the sample region as a crosstalk space between the target line L1 and the aggressor line L2 corresponding to the fourth unit sample length a0. Otherwise, if the distance between the target line and the aggressor line corresponding to a unit sample length is less than the height of the sample region, the result optimization module 125 defines the distance as the crosstalk space between the target line and the aggressor line corresponding to the unit sample length.

The result optimization module 125 further outputs a detection result list on the display 15. In one embodiment, the detection result list includes all distances between the target line and the aggressor line along the orientation of the target line, and the extension length of the target line corresponding to the same distance value.

Figure 3:
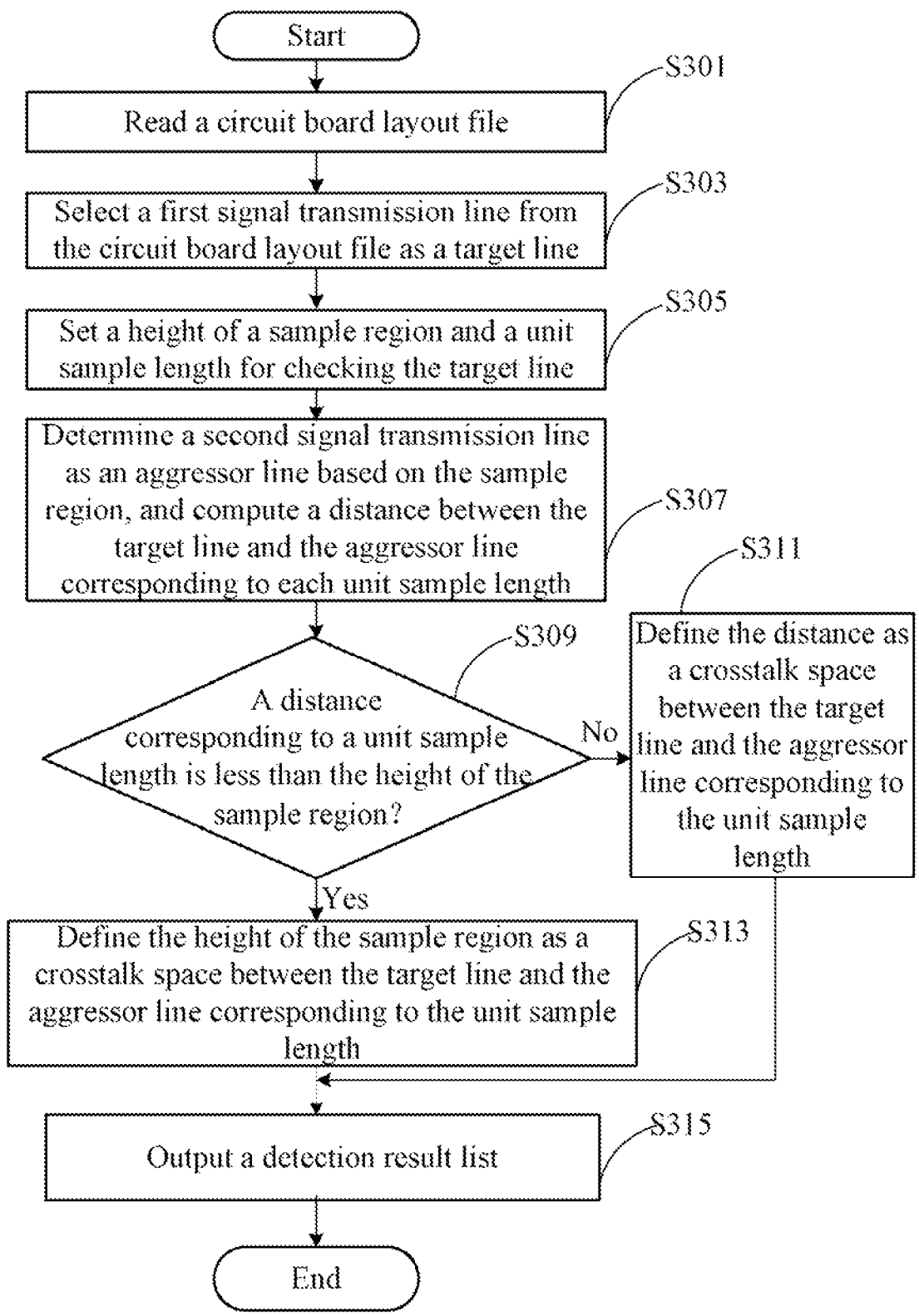
FIG. 3 is a flowchart of one embodiment of a crosstalk information detection method of a circuit board.

FIG. 3 is a flowchart of one embodiment of a crosstalk information detection method of the circuit board 20. Depending on the embodiment, additional blocks may be added, others removed, and the ordering of the blocks may be changed.

In block S301, the file read module 121 reads the circuit board layout file 11 from the storage device 13. As mentioned above, the circuit board layout file 11 includes arrangement information of signal transmission lines of the circuit board 20, such as the number of signal transmission lines arranged on the circuit board 20, length of each signal transmission, and orientation of each signal transmission line.

In block S303, the line selection module 122 selects a first signal transmission line the circuit board layout file 11 as a target line from, to detect crosstalk information from nearby signal transmission lines to the target line. For example, as shown in FIG. 4, a first signal transmission line L1 is selected as a target line L1.

In block S305, the parameter setting module 123 receives detection parameters set by the user. As mentioned above, the detection parameters include a height of a sample region, and a unit sample length along the orientation of the target line. The sample region is an area determined by the target line and a reference line parallel to the target line. The height of the sample region is a distance between the target line and the reference line. For example, as shown in FIG. 4, a reference line L0 and the target line L1 determines the sample region, the distance h between the reference line L0 and the target line L1 is the height of the sample region. In FIG. 4, a0 represents the unit sample length for detecting the target line L1 along the orientation of the target line L1.

In block S307, the information detection module 124 determines a second signal transmission line as an aggressor line according to the sample region. As mentioned above, if a part of a signal transmission line falls in the sample region, the signal transmission line is regarded as the aggressor line. For example, in FIG. 4, the second signal transmission line L2 is regarded as the aggressor line L2. The information detection module 124 further computes a distance between the target line and the aggressor line. For example, as shown in FIG. 4, a distance between the target line L1 and the aggressor line L2 corresponding to each unit sample length a0 along the orientation of the target line L1 is computed, such as the distance h1 corresponding to the first unit sample length a0, the distance h4 corresponding to the fourth unit sample length a0. Then, the unit sample lengths corresponding to the same distance value, such as h1 are totalized as the extension length of the target line, such as L1 corresponding to the same distance value, such as h1.

In block S307, the information detection module 124 determines if the distance between the target line and the aggressor line corresponding to each unit sample length is less than the height of the sample region. If the distance between the target line and the aggressor line corresponding to a unit sample length is less than the height of the sample region, the procedure goes to block S311, the result optimization module 125 defines the distance as a crosstalk space between the target line and the aggressor line corresponding to the unit sample length. Then, the procedure goes to block S315. Otherwise, if the distance between the target line and the aggressor line corresponding to a unit sample length is more than or equal to the height of the sample region, the procedure goes to block S313.

In block S313, the result optimization module 125 defines the height of the sample region as the crosstalk space between the target line and the aggressor line corresponding to the unit sample length. For example, in FIG. 4, corresponding to the fourth unit sample length a0, the distance h4 between the target line L1 and the aggressor line L2 is more than the height h of the sample region, then the result optimization module 125 defines the height h of the sample region as the crosstalk space between the target line L1 and the aggressor line L2 corresponding to the fourth unit sample length a0.

In block S315, the result optimization module 125 outputs a detection result list on the display 15. In one embodiment, the detection result list includes all distances between the target line and the aggressor line along the orientation of the target line, and an extension length of the target line corresponding to the same distance value. For example, the detection result list may display following information: "crosstalk space h, extension length m; crosstalk space h1, extension length m1; crosstalk space h5, extension length m5; . . . ."

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-based crosstalk information detection method of a circuit board, the method comprising:

reading a circuit board layout file from a storage device of a computing device, wherein the circuit board layout file comprises arrangement information of signal transmission lines of a circuit board;

selecting a first signal transmission line from the circuit board layout file as a target line;

receiving detection parameters set by a user, wherein the detection parameters comprise a height of a sample region for detecting aggressor lines of the target line, and a unit sample length along orientation of the target line;

determining a second signal transmission line as an aggressor line of the target line based on the sample region;

computing a distance between the target line and the aggressor line corresponding to each unit sample length; and defining the height of the sample region as a crosstalk space between the target line and the aggressor line corresponding to a unit sample length, if the distance is more than or equal to the height of the sample region, or defining the distance as the crosstalk space between the target line and the aggressor line corresponding to the unit sample length, if the distance is less than the height of the sample region.

2. The method as claimed in claim 1, further comprising:
outputting a detection result list on a display of the computing device, wherein the detection result list comprises all distances between the target line and the aggressor line and an extension length of the target line corresponding to the same distance value.

3. The method as claimed in claim 1, wherein the arrangement information of signal transmission lines comprises the number of signal transmission lines arranged on the circuit board, length of each signal transmission, and orientation of each signal transmission line.

4. The method as claimed in claim 1, wherein the sample region is an area determined by the target line and a reference line parallel to the target line, and the height of the sample region is a distance between the target line and the reference line.

5. The method as claimed in claim 1, wherein the distance between the target line and the aggressor line corresponding to each unit sample length is a largest distance value between the aggressor line and a longest extension length of the target line corresponding to the unit sample length.

6. The method as claimed in claim 2, wherein the unit sample lengths corresponding to the same distance value are totalized as the extension length of the target line corresponding to the same distance value.

7. The method as claimed in claim 1, wherein the storage device is selected from the group consisting of a smart media card, a secure digital card, and a compact flash card.

8. A computing device, comprising:
a storage device;
at least one processor; and
a detection unit comprising computerized code in the form of one or more programs, which are stored in the storage device and executable by the at least one processor, the one or more programs comprising:

a file read module operable to read a circuit board layout file from the storage device, wherein the circuit board layout file comprises arrangement information of signal transmission lines of a circuit board;

a line selection module operable to select a first signal transmission line from the circuit board layout file as a target line;

a parameter setting module operable to receive detection parameters set by a user, wherein the detection parameters comprise a height of a sample region for detecting aggressor lines of the target line, and a unit sample length along orientation of the target line;

an information detection module operable to determine a second signal transmission line as an aggressor line based on the sample region, and compute a distance between the target line and the aggressor line corresponding to each unit sample length; and a result optimization module operable to take the height of the sample region as a crosstalk space between the target line and the aggressor line corresponding to a unit sample length, if the distance is more than or equal to the height of the sample region, and operable to take the distance as the crosstalk space between the target line and the aggressor line corresponding to the unit sample length, if the distance is less than the height of the sample region.

9. The computing device as claimed in claim 8, wherein the result optimization module is further operable to output a detection result list on a display of the computing device, wherein the detection result list comprises all distances between the target line and the aggressor line and an extension length of the target line corresponding to the same distance value.

10. The computing device as claimed in claim 8, wherein the arrangement information of the signal transmission lines comprises the number of signal transmission lines arranged on the circuit board, length of each signal transmission, and orientation of each signal transmission line.

11. The computing device as claimed in claim 8, wherein the sample region is an area determined by the target line and a reference line parallel to the target line, and the height of the sample region is a distance between the target line and the reference line.

12. The computing device as claimed in claim 8, wherein the distance between the target line and the aggressor line corresponding to each unit sample length is a largest distance value between the aggressor line and a longest extension length of the target line corresponding to the unit sample length.

13. The computing device as claimed in claim 9, wherein the unit sample lengths corresponding to the same distance value are totalized as the extension length of the target line corresponding to the same distance value.

14. The computing device as claimed in claim 8, wherein the storage device is selected from the group consisting of a smart media card, a secure digital card, and a compact flash card.

15. A non-transitory computer readable medium storing a set of instructions, the set of instructions capable of being executed by a processor of a computing device to perform a crosstalk information detection method of a circuit board, the method comprising:

reading a circuit board layout file from the medium, wherein the circuit board layout file comprises arrangement information of signal transmission lines of a circuit board;

selecting a first signal transmission line from the circuit board layout file as a target line;

receiving detection parameters set by a user, wherein the detection parameters comprise a height of a sample region for detecting aggressor lines of the target line, and a unit sample length along orientation of the target line;

determining a second signal transmission line as an aggressor line based on the sample region;

computing a distance between the target line and the aggressor line corresponding to each unit sample length; and defining the height of the sample region as a crosstalk space between the target line and the aggressor line corresponding to a unit sample length, if the distance is more than or equal to the height of the sample region, or defining the distance as the crosstalk space between the target line and the aggressor line corresponding to the unit sample length, if the distance is less than the height of the sample region.

16. The medium as claimed in claim 15, wherein the method further comprises:

outputting a detection result list on a display of the computing device, wherein the detection result list comprises all distances between the target line and the aggressor line and an extension length of the target line corresponding to the same distance value.

17. The medium as claimed in claim 15, wherein the arrangement information of the signal transmission lines comprises the number of signal transmission lines arranged on the circuit board, length of each signal transmission, and orientation of each signal transmission line.

18. The medium as claimed in claim 15, wherein the sample region is an area determined by the target line and a reference line parallel to the target line, and the height of the sample region is a distance between the target line and the reference line.

19. The medium as claimed in claim 15, wherein the distance between the target line and the aggressor line corresponding to each unit sample length is a largest distance value between the aggressor line and a longest extension length of the target line corresponding to the unit sample length.

20. The medium as claimed in claim 16, wherein the unit sample lengths corresponding to the same distance value are totalized as the extension length of the target line corresponding to the same distance value.

\* \* \* \* \*